Figure 6:
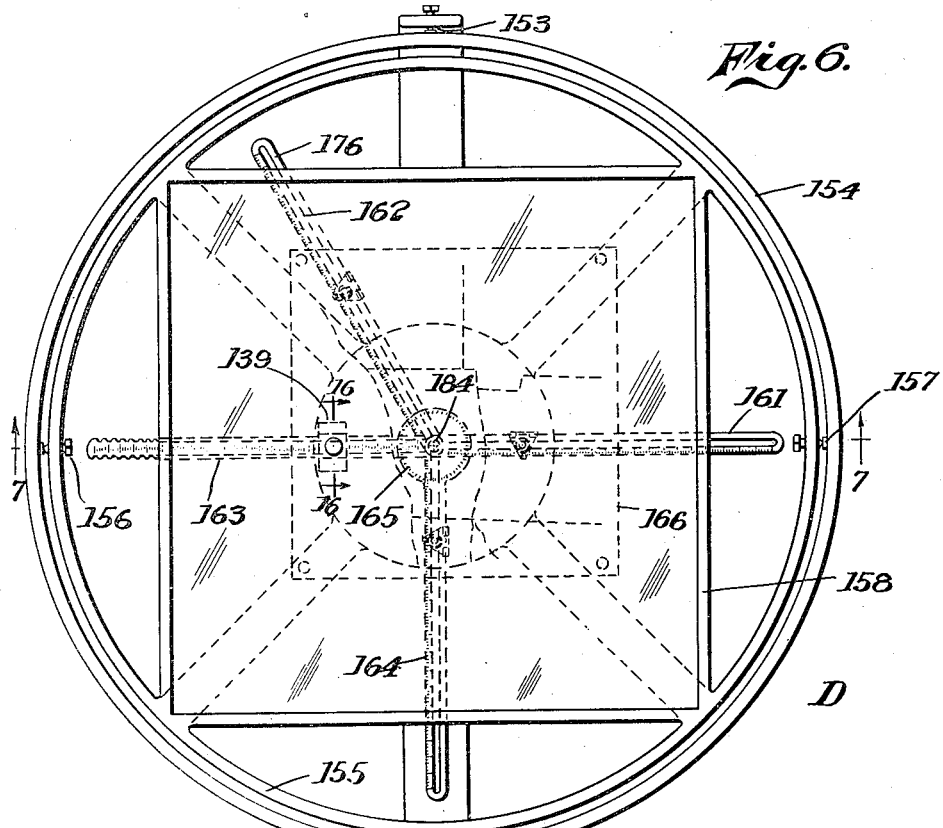

July 3, 1934.  W. S. EATON  1,965,098
METHOD AND APPARATUS FOR DETERMINING POSITION
Filed Feb. 23, 1928    4 Sheets-Sheet 1
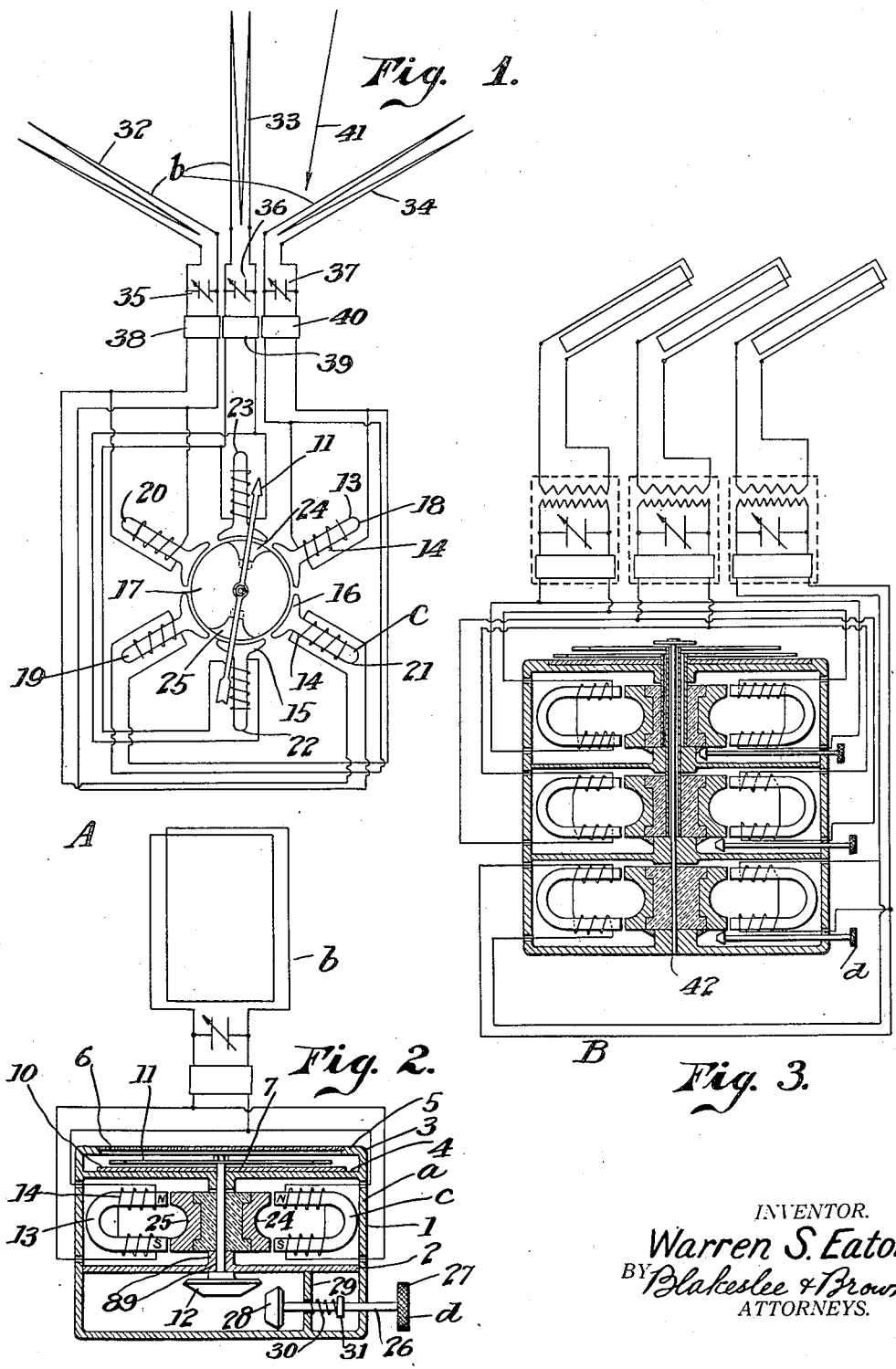
INVENTOR.
Warren S. Eaton
BY Blakeslee & Brown
ATTORNEYS.

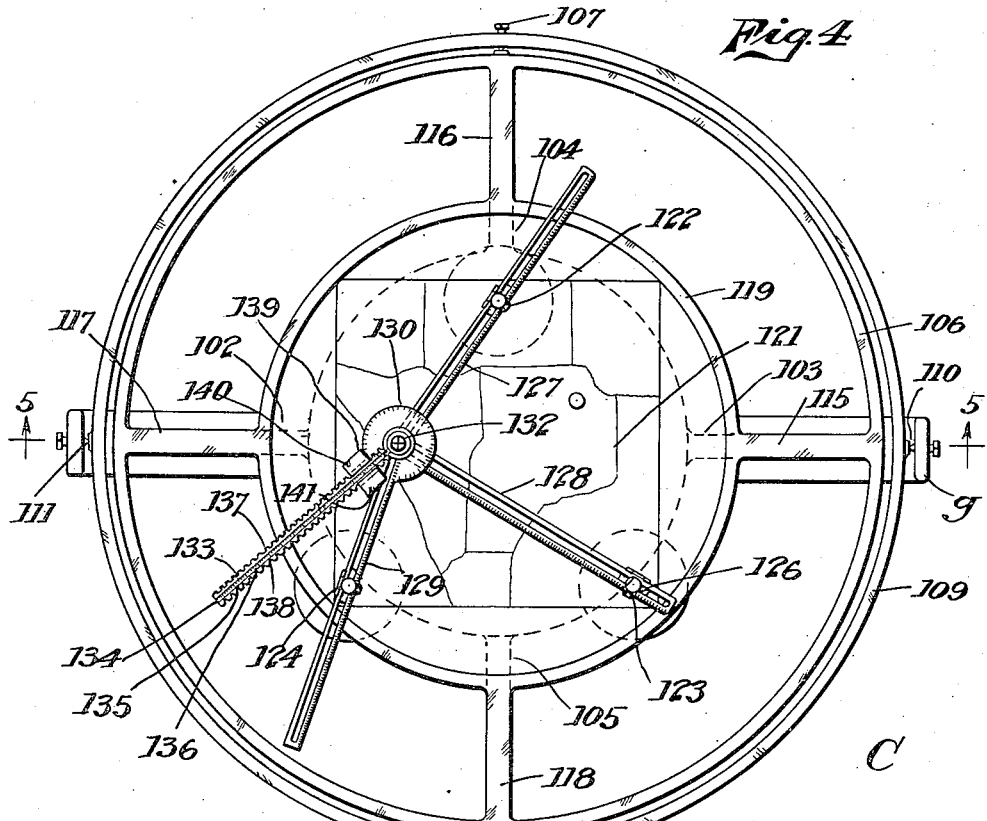
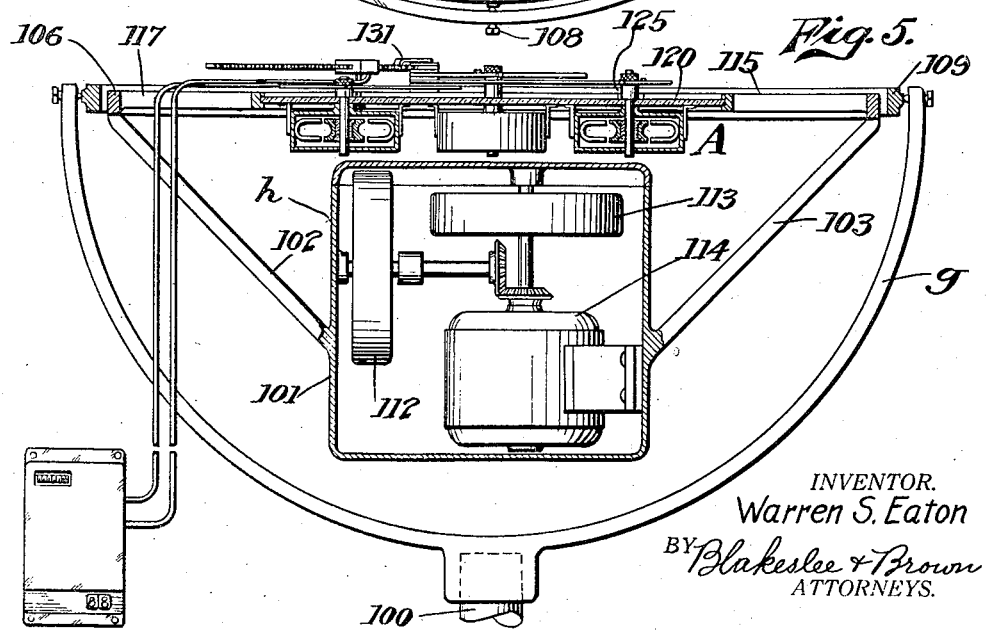

July 3, 1934.  W. S. EATON  1,965,098
METHOD AND APPARATUS FOR DETERMINING POSITION
Filed Feb. 23, 1928  4 Sheets-Sheet 3

INVENTOR.
Warren S. Eaton
BY Blakeslee & Brown
ATTORNEYS.

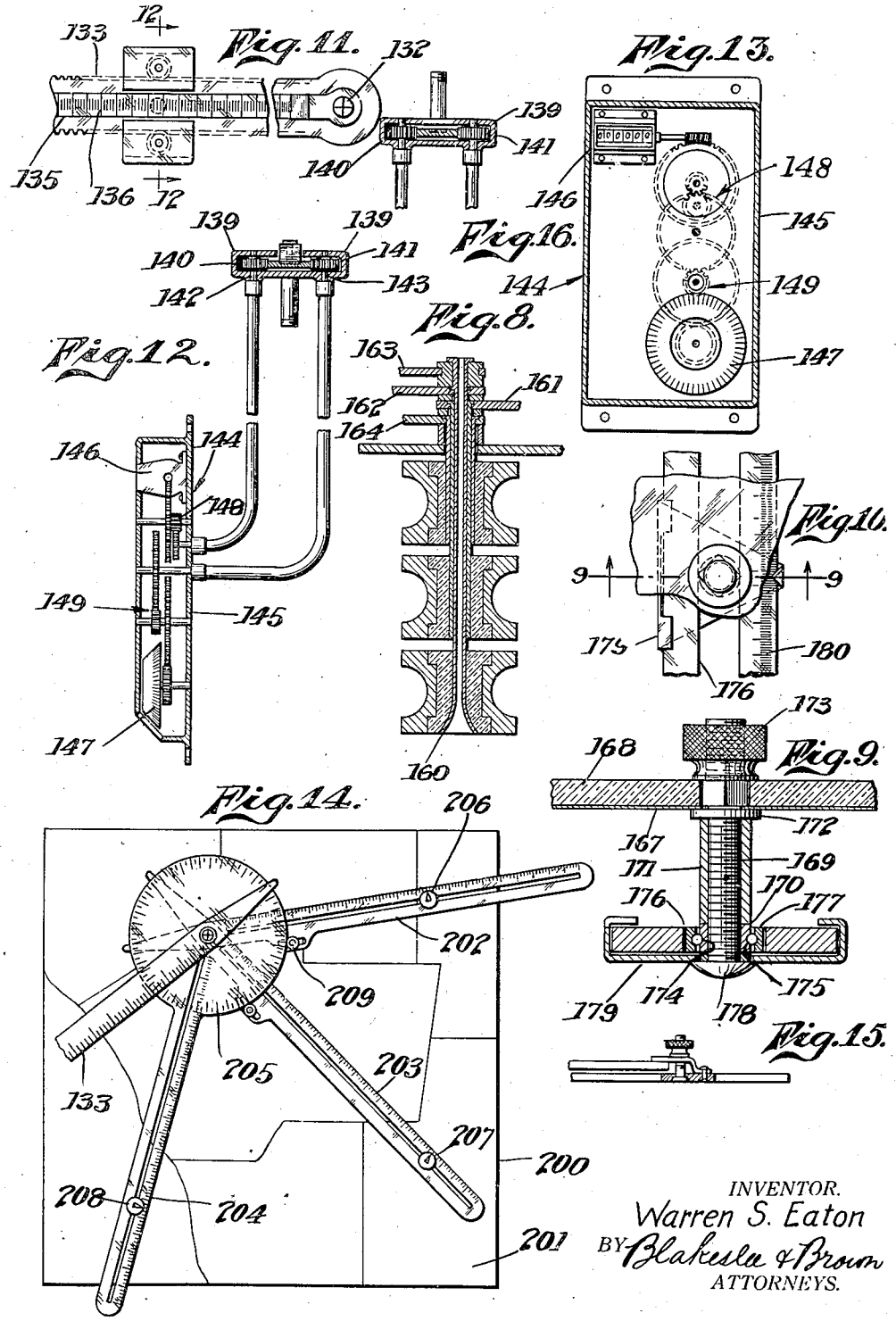

Patented July 3, 1934

1,965,098

UNITED STATES PATENT OFFICE 1,965,098

METHOD AND APPARATUS FOR DETERMINING POSITION

Warren S. Eaton, Los Angeles, Calif., assignor, by mesne assignments, to Eaton Radio Instrument Corporation, Los Angeles, Calif.

Application February 23, 1923, Serial No. 256,228

35 Claims. (Cl. 250—11)

This invention relates broadly to navigating instruments of the type which are particularly adaptable for vehicles such as airplanes, dirigible balloons, helicopters, and the like, as well as the navigation of boats. In particular the device is adapted to utilize the electro-magnetic waves emanating from a plurality of radio sending stations and by means of such electro-magnetic wave or waves it is possible with my invention to at all times accurately and positively determine the exact location of the vehicle being navigated.

It is also an object of my invention to provide a navigation instrument or combination of instruments which will accurately determine or show the position of said vehicle relative to certain objects on the earth in that my invention will determine or show the exact distances from said objects to said vehicle as well as the angular relation of said objects to said vehicle.

Another object is the provision of means whereby the distance traveled along a course may be determined or shown at any or all times as well as the direction of travel along the course at any instant.

Other objects include means whereby the distances from and angular relations of certain points stationary or moving may be determined.

Other objects include means whereby the speed of the vehicle relative to the earth or other object such as water, together with the drift of the vehicle in relation to such objects may be determined or shown at any or all times.

Another object of this invention is to provide means whereby the speed of the vehicle in relation to the earth or any known or unknown points thereon may be both manually or automatically determined.

The invention has for further objects the provision of a system and means which is accurate in operation and generally superior in use and serviceability.

With the above and other objects in view, the invention consists in the novel and useful provision, formation and relative arrangement of parts, members and features as well as the method of use of the invention, all as disclosed in certain embodiments in the accompanying drawings, described generally and more particularly pointed out in the claims.

Figure 7:
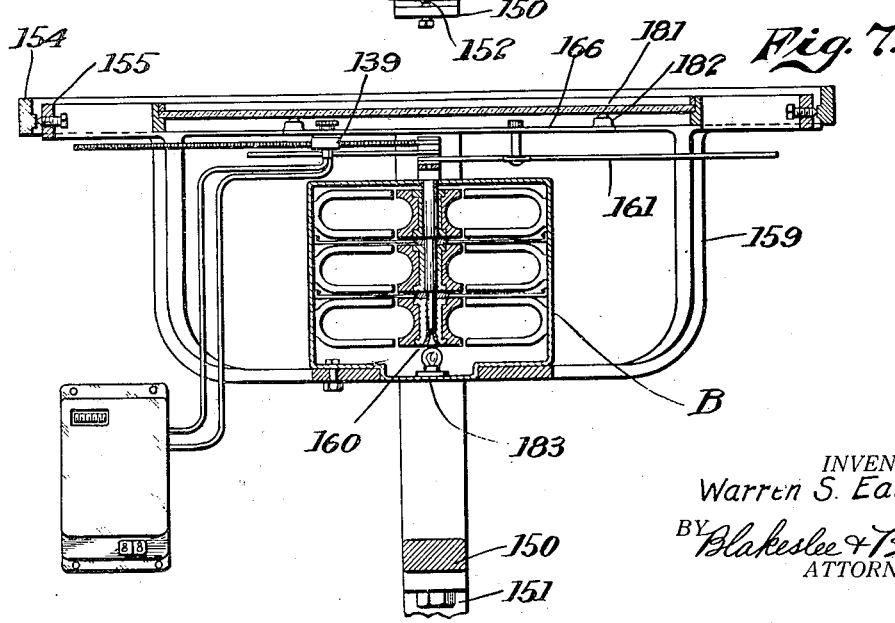

In the drawings:

Figure 1 is a diagrammatic view illustrating a circuit which may be utilized in practicing one embodiment of the invention, Figure 2 is a cross sectional view of certain of the apparatus utilizing the circuits shown in Figure 1, Figure 3 is a wiring diagram, certain elements of the invention being shown in section, being a modification of the form of the invention shown in Figures 1 and 2, Figure 4 is a plan view of an apparatus utilizing certain features of the invention shown in Figures 1 and 2, Figure 5 is a cross sectional view on the line 5—5 of Figure 4, Figure 6 is a plan view of a modified form of the invention illustrated in Figure 4, Figure 7 is a cross sectional view on the line 7—7 of Figure 6, the said invention utilizing the embodiment of the invention illustrated in Figure 3, Figure 8 is a vertical sectional view of a slight modification of certain of the showing of Figure 3, Figure 9 is a sectional view on the line 9—9 of Figure 10, Figure 10 is a plan view of the showing of Figure 9, Figure 11 is an enlarged plan view of a certain element of the invention shown in Figures 4 and 5, Figure 12 is a cross sectional view on the line 12—12 of Figure 11, Figure 13 is a plan view partly in section of a registering device used in practicing the invention, Figure 14 is a plan view of a modified form of the invention, Figure 15 is an enlarged view of certain of the elements of Figure 14, and Figure 16 is a cross sectional view on the line 16—16 of Figure 6.

Corresponding parts are designated by like reference characters.

Referring now with particularity to the drawings, I have shown at Figures 1, 2 and 3 wiring details of certain devices which may be utilized in conjunction with both portions of my invention illustrated in the remaining figures, and which wiring details and members of these said Figures 1 to 3 inclusive have been fully disclosed and described in my copending application for Method and means of determining direction, filed in the United States Patent Office October 8, 1927, Serial No. 224,997 of which the present application is a continuation in part.

The schematic diagrams of Figures 1 and 2 designated as an entirety by A and the form of Figure 3 by B and the function of these two devices will be described first in order that the relationship between these said devices and the inventions to be later described will be fully understood. Referring to that form of the invention as illustrated in Figures 1 and 2, I have shown a direction indicator $a$ which operates in conjunction with two or more aerials or antennæ $b$. The direction indicator $a$ includes in its simplest embodiment a casing 1 provided with a sub-base 2 and with a cap 3. The cap 3 may be held to the casing in any suitable manner and the same includes a plate 4 formed with a flange 5, the said flange being adapted to receive a transparent covering plate 6. The member 4 is provided with a central enlargement 7 as is likewise the sub-base 2, as shown at 8, and the said enlargements 7 and 8 are centrally bored to receive a shaft 9 passed therethrough. An indicator scale 10 is secured to the member 4, and an indicator 11 is secured to one end of the shaft. The opposite end of the shaft 9 carries a friction cone 12. Included between the member 4 and the sub-base 2 is means c adapted to influence movement of the pointer in its play over the scale. This means forms a part of the direction indicator a, and includes a series of field pieces 13 arranged in angular relation, as shown in Fig. 1. This angular relation will depend to a certain extent upon the antenna b, as will appear more fully. Wound on said field pieces are wire coils 14 and the polarity of said field pieces will depend upon the direction of flow of electricity through said wire coils. The field pieces are shown in horse-shoe form with the ends enlarged, as shown at 15, and curved at 16. Secured to the shaft 9 is a non-magnetic flux carrying member 17 and which member 17 in the present instance is substantially circular and lies between the enlarged ends 15 of the several field pieces. It will be noted upon referring to Figure 1 that I have arranged the number of field pieces substantially 60° apart, although other angular relations may be utilized depending on condition and service. The field pieces 13, shown at 18 and 19, are related, as are likewise the field pieces 20 and 21 and field pieces 22 and 23. In other words, oppositely aligned field pieces are related. Secured to the member 17 and diametrically oppositely arranged are pole pieces 24 and 25. Said pole pieces are slightly spaced from the heads of each field piece and bridge the gap between the upper and lower enlarged heads of the field pieces, as best illustrated in Figure 2.

In Figure 1, I have shown three separate antennæ b, at 32, 33 and 34. Each antenna is substantially a loop or coil of wire of standard form arranged in certain angular relation and it will be noted that the antenna 32 substantially parallels the field pieces 20 and 21 as do likewise the antennæ 33, 34 relative to the field pieces 22 and 23, and 18 and 19, respectively. I have not shown any particular apparatus for either receiving, tuning, or amplifying the broadcast wave although I have shown capacities at 35, 36 and 37, and amplifying means at 38, 39 and 40. The different antennæ would be associated with the different capacities and with the different amplifying units and it is intended that the amplification for all of the units should be uniform. As shown in my applications Serial Nos. 224,997, 348,031 and 355,015 the carrier wave strength received from a given broadcast station by the directional antennæ b varies in amount with the angular displacement of each individual antenna relative to the sending station indicated by the arrow 41. As the carrier wave strength varies in the antennæ units, so also will the effect of the strength of said carrier wave vary in the electrically connected coils mounted on the respective field pieces. Each pair of oppositely disposed pole pieces are connected in series so that like poles are diametrically opposite, i. e., north poles facing north poles, and south poles facing south poles. Inasmuch as the members of each pair of pole pieces are energized from the same antenna the fields of force generated thereby are equal and disposed diametrically opposite one another, but of course different in strength from that of the fields generated by each of the other pairs of pole pieces. The effect of the several different pairs of fields of force is that of two diametrically opposite fields of force lying in predetermined directional relation with respect to the direction of the incoming carrier wave, and this effect acting upon the pole pieces 24 and 25 of the rotor 17 will cause the latter to turn until its pole pieces 24 and 25 are balanced by said resultant field effects, whereby the indicator 11 will lie in the line of direction of the incoming carrier wave.

When the general direction of the transmitting station is not known, it will not be apparent to the operator whether the arrow end of the indicator is pointing toward or away from the station. This fact can be readily determined by introducing the earth capacity into one side of the receiving set input in the well known manner, the introduction of this capacity on the side away from the station will be effective to substantially "cut out" the incoming signal according to the well known "cardioid effect".

When the direction to the broadcast station has thus been determined, if the arrow end of the indicator 11 is not indicating the direction to the broadcast station, but is indicating a direction 180° therefrom, it may be manually turned 180° to indicate the direction of the station, where it will be held by the fields of force created by the energy received from said station. Means for accomplishing this result have been shown in Fig. 2 and comprises the means d including a shaft 26 carrying a finger piece 27 at one end and a cone 28 at the other end. This means is secured within the casing by having the shaft thereof pass through the side wall and a partition wall 29 of the casing and the said cone is normally urged from the friction cone 12 through the medium of a coil spring 30 surrounding the shaft and bearing at one end against the partition wall and at the opposite end against the collar 31 carried by the shaft.

The unidirectional feature as disclosed in the present application and also in my application, Serial No. 224,997, filed October 8, 1927, is not claimed herein but is claimed in my application, Serial No. 355,015, filed April 15, 1929 Patent No. 1,842,343.

The basic principle of the utilization of fields of force for actuating an indicator to indicate the line of direction to the broadcast station, as shown and described in the present application and also in application, Serial No. 224,997, is not claimed in the present application, but is claimed specifically in my application, Serial No. 348,031, filed March 18, 1929, Patent No. 1,842,347 and broadly in my divisional application, Serial No. 554,307, filed July 31, 1931 Patent No. 1,842,342.

The form of the device shown in Figure 3 and designated by B permits tuning for any desired number of stations to the end that angular bearings may be taken relative to said several stations. This form of the invention consists in providing a plurality of the devices shown in Figures 1 and 2, one mounted above the other with suitable shielding means therebetween. Furthermore, I provide independent antennæ coils for each device, the antennæ coils following the same principle as just described for the form A. With this form of the invention, it is possible to tune to three independent broadcast stations and the indicators for each device would point toward its respective station in accordance with the principle as enunciated for that form of the invention shown in Figures 1 and 2.

If that form of the invention shown in Figure 3 has been utilized and the angular relation between the different broadcast stations is known, as would be indicated by the several indicators of said device, the position of any vehicle carrying said device may be accurately determined and likewise its distance from the broadcast stations calculated, when the distances between the broadcast stations are known. This would be an ordinary trigonometric calculation. This point brings us to the main feature of this invention as the devices just described for Figures 1 to 3 inclusive have been fully set forth in my application Serial No. 224,997, above designated.

Reference is now had to Figures 4 and 5, and this form of the invention is designated as an entirety by C. The device to be described with relation to the apparatus of Figures 1 to 3 is adapted to measure the absolute speed of a vehicle relative to some other object, such as the ground to an air vehicle, or the water to a vessel, or for that matter a land vehicle relative to the ground over which it is passing. It is to be particularly noted in the case of air vehicles that this device does not register the effect of head winds or side drifts but determines accurately the absolute speed of the vehicle relative to the ground the same as a speedometer now functions on such land vehicles as automobiles. Side drift and parasitic resistances as well as skin friction are all included with this device.

The device C includes a semi-circular framing g suitably mounted on a stand 100. A gyroscopic device h is provided for maintaining a certain position of elements of the invention and said gyroscopic device includes a casing 101 held by means of arms 102, 103, 104 and 105 to a ring 106. This ring in turn is secured by means of gimbals 107 and 108 to a second ring 109, the latter of which is held by gimbals 110 and 111 to the framing g. The gyroscope h includes two discs 112 and 113 arranged at right angles and suitably carried on shafts journaled within the casing and which shafts are adapted to be rotated through the medium of a motor 114. The said ring 106 is provided with radial arms 115, 116, 117 and 118, which are joined with a support ring 119. A map carrying member 120 is carried within the groove of said ring, and a map is roughly indicated in Figure 4 at 121. Known radio broadcast stations are shown on the map at the zones marked 122, 123 and 124. Precisely at the locations on the map of said radio stations, I utilize the means A or B as shown in Figures 1 to 3. However, in the present embodiment of the invention, I have used the means shown in Figures 1 and 2. The rotor shaft 9 of each of the devices A is passed through an opening in the map carrying member 120 at each radio station point, as shown at 125. Secured to each shaft 9 is a traveling block 126 and this traveling block 126 in each instance is adapted to be received within longitudinal slots of scale arms 127, 128 and 129. One of the scale arms is fixedly secured to a 360° protractor 130, and a hollow stud or annulus is passed through the center of said protractor and the remaining scale arms are secured to said stud in such a manner that the said scale arms are movable relative to the stud. This construction is illustrated at 131, Figure 5. Angularly related cross hairs 132 span the opening of said stud or annulus. A further arm 133 is movably secured to the stud. The arm 133 is grooved longitudinally at 134, and receives a flat strip 135 provided with a scale 136. Furthermore, the arm 133 is provided with rack teeth along the longitudinal sides thereof, as shown at 137 and 138. A rider or carrier 139 has journaled thereto pinions 140 and 141 adapted to engage the rack teeth of the arm and these pinions have secured thereto flexible shafts 142 and 143, see Figures 11 and 12, which shafts lead to a speedometer 144 consisting of an odometer and speed indicator. This speedometer includes a casing 145 within which is the odometer 146 and likewise a speed indicator 147. The shaft 142 is adapted to drive through gearing, designated generally at 148, the said odometer while the shaft 143, through the medium of gear 149, operates the speed indicator 147. The two forms of devices for driving the odometer and the speed indicator are shown in Figures 12 and 16. That form of mounting in Figure 16 is adapted to be placed under the glass member 181, whereas that form shown in Figure 12 is adapted to overlie the map member 120. It is to be understood that while the speed indicator 147 is illustrated as comprising a graduated disk associated with gearing 148, that various means may be employed for indicating the relative speed of the point 132 over the area 121. Also that electrical or mechanical means may be employed to magnify the motion of the point 132 in the speed indicator 147.

The operation of this device just described is as follows:

Having selected a given map and likewise knowing that definite broadcast stations are located on said map at the points 122, 123 and 124 and likewise knowing your starting position, which will be directly under the cross hairs of the protractor, upon starting the course the several devices A will operate to move the shafts 120 and therefore cause movement of the protractor through the respective arms associated therewith. The arm 133 will also move and actuate the train of gears in the odometer and speed indicator so that an operator of a vehicle employing the device will at all times be apprised of his absolute ground speed and distance of travel from the starting point. If the vehicle should be off course, it is possible to lift the member 136 containing a scale and swing it relative to the stud passed through the protractor and measure his distance either to a given broadcast station, a given zone on the map, or his absolute distance from the starting point. In the case of air vehicles if a forced landing was made, or some landing field was desired, the instrument would immediately indicate the exact position of the plane on the map and it would be a simple matter to then determine the exact distance to any other point or desired landing field on the map by using the scale 136. The device will be maintained in a substantially horizontal position relative to the earth's surface through the gyroscopic means h regardless of the angularity assumed by the vessel relative to the earth or other medium through which or over which the vehicle is traveling.

The form of the invention illustrated in Figures 6 and 7 does not differ in essential details from the device C save and except that the map in the form shown in Figures 6 and 7 is movable, whereas in the form C the map is immovable, the scale arms being movable over said map. There is a further difference in that the gyroscopic device will at all times be maintained in a definite position regardless of the turning of the vehicle, it being noted that semi-circular bracket $g$ connects to the standard, as at 100, and that the bracket is rotatable upon said standard. Thus, the vehicle might make a right hand turn due to a wind gust or some other reason but the gyroscopic device would hold the map in a definite relation regardless of said turning.

The form of the invention shown in Figures 6 and 7 is designated by D and this form of the invention does not employ a gyroscope but the map is movable through the medium of means such as illustrated in Figure 3. The result attained would be substantially the same as for that form of the device C. As before, I provide a semi-circular member 150 which is secured to some standard 151. This member 150 is provided with gimbals 152, 153 which secure a ring 154. A second ring 155 is secured by gimbals 156, 157 to the ring 154. The ring 155 is provided with a substantially square framing 158. Furthermore, the said ring carries downwardly extended arms 159 adapted to act as supports for the device B. The means $d$ of the means B is unnecessary in the present embodiment of the invention and furthermore the shaft 42 is hollow and belled at its lower end 160. The reason why the means $d$ is unnecessary is due to the fact that the arms, of which there would be a multiple number, are movable or adjustable which would accomplish the same function that the means $d$ previously accomplished for adjusting the needle arms. This construction is detailed in Figure 8, wherein it will be seen that independent shafts are provided for each device. As before, I have provided arms 161, 162, 163 and 164, the arm 164 being fixedly associated with the protractor 165. A transparency 166, which would be the map, is associated with the arms before mentioned.

Referring to Figure 9, the transparent map is shown at 167 and which map is secured or situated against a transparent medium 168, which may be glass or other suitable substance. The means for securing the map to the several arms is also shown in this figure, and includes a bolt 169 surrounding which is a bearing member 170, a bushing 171 surrounding the bolt and bearing against the bearing member 170, and likewise bearing against a washer 172, which washer would engage the map 167. A nut 173 would engage the opposite side of the member 168 to the end that the bolt would be rigidly held to said map. The bearing member 170 is grooved, as shown at 174 and 175, to receive rollers and each arm is formed with a longitudinal groove 176 and receives the outer ring 177 of the bearing, this bearing, of course, cooperating with the rollers. The bolt head 178 is likewise adapted to clamp an indicator plate 179. This indicator plate is substantially triangular in form, one apex thereof being bent so that the pointed end plays over the scale 180 on an arm, while the base portion of the triangular member is bent so as to surround the said arm, as illustrated in Figures 9 and 10. The indicator has clearance between the arms so that it does not actually engage the arm. Carried by the square framing 158 is a transparent member 181 and in order to keep the map member substantially in one plane, the said map member is provided with a series of rollers suitably mounted in sockets 182 and which rollers engage the under surface of the member 181, as shown in Figure 7. It will also be noted that the map does not have as great a superficial area as the superficial area of the member 181. The member 163 corresponds with the arm 133 and it will be noted that the member 139 is provided as before for driving an odometer and speedometer, as detailed in Figures 11, 12 and 16. The casing for the device B carries a small illuminating device, such as an incandescent bulb 183, the light of which is passed through the hollow shaft and will illuminate the cross hairs 184 as shown at the top of said shaft. Thus a shadow of the cross hairs will be cast against the map which can be readily seen by any operator of the device and an exact position of the vehicle relative to the course being followed can at all times be determined.

The operation of this device is as follows: As before, the connecting elements between the protractor scale arms and the map are placed in such a position that they have a definite meaning relative to said map; in other words, they would be placed at the exact positions on the map of broadcast stations whose carrier waves are to be received for indicating angularities between the different broadcast stations. If a given starting point is known and the vehicle commences travel, the device B would operate to turn the different respective shafts, causing movement of the scale arms and the map, the position of the cross hairs relative to the map indicating the position of the vehicle and its direction of travel relative to the map, as before stated. The speedometer would indicate the absolute speed of the vehicle relative to the medium over which it is traveling.

The form of the invention shown in Figure 14 does not differ in essential detail from the forms of the invention just previously described. However, the form of the invention in Figure 14 may be operated independently of any means for automatically actuating the scale arms. I may, for instance, utilize either one of the means designated as A and B and the said means may be mounted upon the instrument board of the vehicle and the position of the pointers read independently. Having secured given independent angular positions of the several indicators relative to the scale, each indicator pointing to its respective broadcast station, I then take a board or other surface 200, upon which appears a map 201, and by the use of several protractor arms 202, 203 and 204, two of which are movably secured to a protractor 205, accurately determine the position of the vehicle relative to the said map. For instance, I place thumb tacks through the longitudinal grooves of the several arms at the positions 206, 207 and 208 on the map of said broadcast stations. Having determined the exact angular directions to said broadcast stations I adjust the angularity of the protractor arms accordingly and then the center or cross hairs of the protractor, will designate on the map the exact point or position of the vehicle. The scale on said arms would indicate the distance of the vehicle from any of the broadcast stations. If desired, I might use a fourth arm of the form shown in Figure 4 and designated as 133. This device allows an operator of a vehicle to manually plot his course or to check his position at any given time that he might desire without the aid of automatic instruments, such as has been described for accomplishing this result.

The automatic instruments require no attention of the pilot or navigator of the vehicle and thus the pilot or navigator can direct all his attention to the operation of the craft and at the same time determine at any given instant any navigation information that he might desire. The pilot, if he desired to check his navigation could use either one of the automatic devices before described as well as the manually operated device of Figure 14 and check one against the other.

It is obvious that various changes, modifications, variations and refinements of the before mentioned inventions may be made in practice in departure from the several embodiments of the said inventions without, however, departing from the true spirit thereof.

Having thus disclosed my invention, what I claim and desire to secure by Letters Patent is:

1. The method of locating an unknown point position, which consists in emanating broadcast waves from known point positions, receiving the said broadcast waves at said unknown point position, resolving the said received broadcast waves into fields of force, each of which is in the direction of its respective broadcast wave, indicating by means of these fields of force the angles between the known point positions and the unknown point position, then measuring the angles between said known points and the unknown point position as indicated at said unknown point position, then scaling the distance between the indicated unknown point position and one of said known point positions.

2. An apparatus for indicating in similitude upon a map, the position of a body in relation to broadcast stations located at known points on known territory which embodies a scaled map corresponding to said known territory, radio receiving apparatus for each known point positions on said map corresponding to the point positions of the radio broadcast stations in said territory, and separate direction indicators at said known point positions each of which is controlled by its respective receiving apparatus to generate a separate field of force at said point to indicate the direction to that broadcast station by which its receiving apparatus is energized.

3. An apparatus for indicating in similitude upon a map, the position and rate of travel of a moving body in relation to known points which embodies: a scaled map on said body and corresponding to known territory and upon which the positions of known radio transmitters are located; receiving apparatus for receiving radio energy from the stations indicated on said map; swinging indicators associated with said map at the points corresponding to the transmitting stations; indicator operating means controlled by said receiving apparatus to generate separate fields of force at said points to swing said indicators into the directions of the transmitting stations by which the receiving apparatus is energized, said swinging indicators being interconnected at a common point; means at said connecting point for indicating the position of said body on said map; and means operable by the movement of said point to indicate the rate of travel of said body across said map.

4. In a device of the character disclosed, a scaled map, a protractor provided with scaled arms for placement relative to said map, means adapted to be actuated by received electro-magnetic waves for moving said scaled arms to cause movement of said protractor relative to the map, said arm moving means comprising independent radio operated direction indicators on said map at known locations corresponding to sources of broadcast waves, said indicators being operatively connected to the respective arms.

5. In a device of the character described, a scaled plot, scaled arms inter-connected for joint movement relative to said plot; and independent radio controlled direction indicating means, for causing a swinging movement of each of the arms into the direction to the transmitting station which energizes the respective direction indicating means.

6. An apparatus for indicating in similitude upon a map the position of a body in relation to known points which embodies: a scaled map corresponding to territory upon which the position of known radio transmitters are located; swinging arms having pivot points arranged on said map at locations corresponding to said transmitting stations; and means located at said pivotal points actuated by energy received from said transmitting stations for swinging said arms into substantially the same directional relation with said map as the corresponding transmitted wave bears to the body.

7. An apparatus for indicating in similitude upon a map the position of a body in relation to known points which embodies: a scaled map corresponding to territory upon which the position of known radio transmitters are located; swinging arms having pivot points arranged on said map at locations corresponding to said transmitting stations; and means located at said pivotal points actuated by energy received from said transmitting stations for swinging said arms into substantially the same directional relation with said map as the corresponding transmitted wave bears to the body, each of said last mentioned means comprising a rotor and a plurality of electro-magnetic field elements.

8. An apparatus for indicating in similitude upon a map the position of a body in relation to known points which embodies: a scaled map corresponding to territory upon which the position of known radio transmitters are located; swinging arms having pivot points arranged on said map at locations corresponding to said transmitting stations; and means located at said pivotal points actuated by energy received from said transmitting stations for swinging said arms into substantially the same directional relation with said map as the corresponding transmitted wave bears to the body, said swinging arms being interconnected at a common point which indicates the position of said body.

9. An apparatus for indicating in similitude upon a map the position of a vehicle carrying said map in relation to radio transmitting stations the positions of which are fixed on said map, which embodies: swinging arms pivotally mounted on said map at the points corresponding to the positions of said transmitting stations; rotors adapted to impart swinging movement to said arms; electro-magnetic field members arranged about each of said rotors; and means operated by radio energy coming from each of said transmitting stations for creating a resultant field of force in each set of field pieces which bears a predetermined directional relation to the transmitting station from which the particular set of field pieces is energized.

10. An apparatus for determining the speed of a vehicle with respect to a given medium which embodies: a scaled map corresponding to the territory being transversed by the vehicle, and upon which points corresponding to the known positions of radio transmitting stations are located; radio dynamically operated indicator arms pivoted coaxially with the points corresponding to the positions of said transmitting stations;

means for connecting said arms at a single point; a rack connected with said connecting means; pinions associated with said rack; and speed indicating means adapted to be driven by said pinions.

11. The method of determining the position of a point with relation to a plurality of fixed known sources of electro-magnetic energy, which comprises receiving the electro-magnetic energy from said sources, resolving the energy from said sources into fields of force each of which bears a predetermined directional relation to its source of energy and at positions disposed in similitude of the actual positions of said sources of energy, utilizing said fields of force to indicate the directions between said fields and said respective sources of energy, whereby the intersection of said directions indicates the position of said point relative to said sources.

12. The method of determining the position and direction of travel of a moving body with relation to a plurality of fixed known sources of electro-magnetic energy, which comprises receiving on said moving body the electro-magnetic energy from said sources, resolving the energy from said sources into fields of force each of which bears a rotational, predetermined, directional relation to its source of energy and at positions disposed in similitude of the actual positions of said sources of energy, utilizing said fields of force to indicate the directions between said fields and the respective sources of energy, whereby the intersection of said directions indicates the position of said body relative to said sources and will move in similitude of the movement of said body.

13. The herein described method of moving a member in similitude of a moving body which comprises, receiving on the moving body electro-magnetic energy from a plurality of fixed known sources, resolving said energy, at separate locations in similitude of the locations of the respective sources of energy, into fields of force bearing a rotational, predetermined, directional relation to the respective sources of said energy, the point of intersection of the directions of said fields of force indicating in similitude the position of the body with respect to the known sources of energy, utilizing said fields of force to move said member located at the point of intersection of the directions of said fields of force in similitude of the movement of said moving body, and utilizing the movement of said member to indicate the rate of travel of said body.

14. An apparatus for determining the location of a body by means of a plurality of different electro-magnetic energies received from a plurality of fixed known sources of electro-magnetic energy, comprising means for receiving the energies, a map on which is located known positions of the sources of said received electro-magnetic energy, direction indicators located at said known positions on the map and in which are developed by the energies received from said sources fields of force each bearing a predetermined directional relation to its respective source of energy, pivotally connected arms, and means to move the arms by the respective fields of force into alignment with said known positions.

15. An apparatus for determining the speed of a moving body by means of a plurality of different electro-magnetic energies received from a plurality of fixed known sources, comprising means for receiving the energies, a map on which is located known positions of the sources of said received electro-magnetic energies, direction indicators located at said known positions on the map and in which are developed by the energies received from said sources fields of force each bearing a predetermined directional relation to its respective source of energy, pivotally connected arms, means to move the arms by the respective fields of force into alignment with said known positions, a speedometer, and means for actuating the speedometer by the movement of the pivotal connection of said arms.

16. The herein described method of indicating an unknown position with respect to known territory, which comprises receiving at the unknown position electro-magnetic energies from a plurality of known positions in said territory, resolving said received energies into fields of force located at positions disposed in similitude of the said known positions and with each of said fields bearing predetermined directional relation to its respective source of energy, and utilizing said fields of force to indicate said unknown position relative to said known positions.

17. The herein described method of indicating on a map an unknown position, which comprises receiving at said position electro-magnetic energies from a plurality of known positions, resolving said received energies into fields of force located at positions disposed in similitude of the said known positions and with each field of force bearing a predetermined directional relation to the direction from the point of reception to its respective source, and utilizing said fields of force to indicate on the map the position of the body.

18. The herein described method of indicating on a map the unknown position of a body with respect to the territory depicted by said map, which comprises receiving on said body electro-magnetic energies from a plurality of known positions, resolving the energy received from each source into a field of force at a point on said map corresponding to said source and with the field of force bearing a predetermined relation to the direction from the point of reception to said source, and utilizing said fields of force to indicate on the map the position of the body relative to said territory.

19. The herein described method of indicating an unknown position with respect to known territory, which comprises receiving at the unknown position electro-magnetic energies from a plurality of known positions, resolving said received energies into fields of force located at positions disposed in similitude of the said known positions and with each of said fields bearing predetermined directional relation to its respective source of energy, utilizing said fields of force to indicate the unknown position by the intersection of the directions between said known and similitude positions, and to indicate the distances between said unknown position and said known positions.

20. The herein described method of indicating on a map the position of a body moving across the territory depicted by said map, which comprises receiving on said moving body electro-magnetic energies from a plurality of known positions on said territory, resolving said energies into fields of force bearing rotational predetermined directional relations to the said known positions and at points on said map corresponding to the known positions in said territory, and utilizing said fields of force to indicate on the map the position of the body by the intersection of the directions from said points on the map to the known positions in said territory.

21. The herein described method of indicating on a map the path of travel of a body moving with respect to the territory depicted by said map, which comprises receiving on said moving body electro-magnetic energies from a plurality of known positions in said territory, resolving said energies into fields of force bearing rotational predetermined directional relations to the said known positions and at points on said map corresponding to the known positions in said territory, and utilizing said fields of force to indicate on the map the path of travel of said body.

22. The herein described method of indicating on a map the path of travel of a body moving with respect to the territory depicted by said map and indicating the speed of said body with respect to said territory, which comprises receiving on said moving body electro-magnetic energies from a plurality of known positions in said territory, resolving said energies into fields of force bearing rotational predetermined directional relations to the respective known positions and at points on said map corresponding to the known positions in said territory, utilizing said fields of force to indicate on the map the point position of the body, moving said point position across the map by the movements of said fields occasioned by the movement of said body to indicate the path of travel of said body, and utilizing the movement of said point position to indicate the rate of travel of said body with respect to said territory.

23. The method of determining the position of a moving body with relation to a plurality of fixed known sources of electro-magnetic energy and direction of travel of said body, which comprises receiving on said body the electro-magnetic energies from said sources, resolving the energies from said sources into fields of force, each of which bears a rotational predetermined directional relation to its source of energy, and utilizing said fields of force for continuously registering the directions between said fields and the respective sources of energy, utilizing the continuously registered directions to register the position of said body relative to said sources and the direction of travel of said body.

24. An apparatus for indicating on a map the unknown position of a body with respect to a plurality of fixed known sources of electro-magnetic energy located in the territory depicted by said map, comprising means for receiving a plurality of different electro-magnetic energies, a map on which is located the known positions of the sources of said received electro-magnetic energy, means for resolving the energy received from each source into a field of force at the point on said map corresponding to the position of said source and with the field of force bearing a predetermined relation to the direction from said point to said source, and means for utilizing said fields of force to indicate on the map the position of the body relative to said territory.

25. An apparatus for indicating on a map the position and path of travel of a body moving across the territory depicted by said map, which comprises means for receiving a plurality of different electro-magnetic energies, a map on which is located the known positions of the sources of said received electro-magnetic energy, means for resolving the energy received from each source into a field of force at the point on said map corresponding to the position of said source and with the field of force bearing a rotational predetermined relation to the direction from said point to said source, and means for utilizing said fields of force to indicate on the map the path of travel of said body.

26. An apparatus for indicating on a map the path and rate of travel of a body moving with respect to the territory depicted by said map, which comprises means for receiving a plurality of different electro-magnetic energies, a map on which is located the known positions of the sources of said received electro-magnetic energies, means for resolving the energy received from each source into a field of force at the point on said map corresponding to the position of said source and with the field of force bearing a rotational predetermined relation to the direction from said point to said source, means for utilizing said fields of force to indicate on the map the point position of the body and for moving said point position across the map by the movements of said fields occasioned by the movement of said body to indicate the path of travel of said body, and means for utilizing the movement of said point position to indicate the rate of travel of said body with respect to said territory.

27. An apparatus for indicating an unknown position with respect to known territory, which comprises means for receiving a plurality of different electro-magnetic energies, means for resolving received energies into fields of force located at predetermined spaced positions and with each of said fields bearing predetermined directional relation to its respective source of energy, and means for utilizing said fields of force to indicate said unknown position relative to said known territory.

28. An apparatus for indicating an unknown position with respect to known territory, which comprises means for receiving a plurality of different electro-magnetic energies, means for resolving the received energies into fields of force located at predetermined spaced positions and with each of said fields bearing predetermined directional relation to its respective source of energy, and means for utilizing said fields of force to indicate the intersection of the directions from the sources to the respective predetermined positions.

29. An apparatus for indicating an unknown position with respect to known territory, which comprises means for receiving a plurality of different electro-magnetic energies, means for resolving the received energies into fields of force located at predetermined spaced positions and with each of said fields bearing predetermined directional relation to its respective source of energy, means for utilizing said fields of force to indicate the intersection of the directions from the sources to the respective predetermined positions, and means for indicating the distances from the intersection to the respective sources.

30. An apparatus for indicating an unknown position with respect to known territory, which comprises means for receiving a plurality of different electro-magnetic energies, means for resolving the received energies into fields of force located at predetermined spaced positions and with each of said fields bearing predetermined directional relation to its respective source of energy, means for utilizing said fields of force to indicate the directions from said sources to the respective predetermined positions and the intersection thereof, which intersection is the unknown position, and also to indicate the distances between said unknown position and said sources of energy.

31. An apparatus for indicating an unknown position with respect to known territory, which comprises means for receiving a plurality of different electro-magnetic energies, means for resolving the received energies into fields of force located at predetermined spaced positions and with each of said fields bearing predetermined directional relation to its respective source of energy, and means for utilizing said fields of force to move members into alignment with the directions from the sources to the respective predetermined positions, means actuated by said members to locate the unknown position, and means to indicate said position.

32. An apparatus for determining the location of an unknown position with relation to a plurality of fixed known sources of electro-magnetic energy, which comprises a map, means for receiving a plurality of different electro-magnetic energies, means for resolving received energies into fields of force located at positions disposed in similitude of the positions of the known sources of energy and with each field of force bearing a predetermined directional relation to the direction from the point to its respective source, and means for utilizing said fields of force to indicate on the map the position of the body.

33. An apparatus for determining the position of a moving body with relation to a plurality of fixed known sources of electro-magnetic energy and direction of travel of said body, which comprises means for receiving a plurality of different electro-magnetic energies, means for resolving the received energies into fields of force located at positions disposed in similitude of the positions of the known sources of energy with each field of force bearing a rotational predetermined directional relation to its source of energy, means for utilizing said fields of force for continuously registering the directions between said fields and the respective sources of energy, and means for utilizing the continuously registered directions to register the position of said body relative to said sources and also the direction of travel of said body.

34. Radio transmitters of different frequencies, a vehicle, radio receivers mounted on said vehicle and equal in number to the number of said transmitters, each of said receivers being responsive only to a particular one of said transmitters, a pilot director fixed to said vehicle and having indicators rotatable concentrically thereon, said indicators being equal in number to the number of said transmitters, each of said indicators being connected to only one of said receivers, and means controlled by energy derived from said transmitters through the receivers responsive thereto for causing said indicators each to point continuously to the respective transmitter which controls the receiver connected thereto.

35. The method of determining the position of a body which is movable relative to a plurality of fixed radio transmitting stations of different radio frequencies, which comprises receiving the radiant energy from the transmitting stations, creating potential difference in the radiant energy received from each station by dividing said radiant energy into two component parts, and utilizing said potential differences to actuate position indicating means.

WARREN S. EATON.

CERTIFICATE OF CORRECTION.

Patent No. 1,965,098.   July 3, 1934.

WARREN S. EATON.

It is hereby certified that error appears in the printed specification of the above numbered patent requiring correction as follows: Page 2, line 134, for "1,842,347" read 1,842,342; and line 136, for "1,842,342" read 1,842,347; and page 3, line 6, for "betwen" read between; and that the said Letters Patent should be read with these corrections therein that the same may conform to the record of the case in the Patent Office.

Signed and sealed this 11th day of September, A. D. 1934.

(Seal)

Leslie Frazer
Acting Commissioner of Patents.